United States Patent

Matsumoto et al.

[11] Patent Number: 6,165,289
[45] Date of Patent: *Dec. 26, 2000

[54] WATER-RESISTANT LONG-LIFE ROLLING BEARING

[75] Inventors: Yoichi Matsumoto; Tomonobu Yoshikawa; Takashi Nagato, all of Kanagawa, Japan

[73] Assignee: NSK Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,746

[22] Filed: Apr. 10, 1997

[30] Foreign Application Priority Data

Feb. 8, 1996 [JP] Japan .................................... 8-204545
Apr. 10, 1996 [JP] Japan .................................... 8-088592

[51] Int. Cl.[7] .................................................. C22C 38/16
[52] U.S. Cl. ........................... 148/332; 148/906; 420/89; 420/90; 384/492; 384/912
[58] Field of Search ...................... 148/906, 332; 420/89, 90; 384/492, 912

[56] References Cited

U.S. PATENT DOCUMENTS

| | | |
|---|---|---|
| 3,734,582 | 5/1973 | Beauchet . |
| 4,023,988 | 5/1977 | Stickels et al. . |
| 4,930,909 | 6/1990 | Murakami et al. . |
| 4,992,111 | 2/1991 | Yamada et al. . |
| 5,013,525 | 5/1991 | Hamada et al. ................. 148/906 |
| 5,137,375 | 8/1992 | Murakami et al. . |
| 5,292,200 | 3/1994 | Matsumoto et al. . |
| 5,413,643 | 5/1995 | Murakami et al. ............... 148/906 |
| 5,705,124 | 1/1998 | Ochi et al. ........................ 148/906 |

FOREIGN PATENT DOCUMENTS

| | | |
|---|---|---|
| A1 0718513 | 6/1996 | European Pat. Off. . |
| C2 3922720 | 1/1990 | Germany . |
| A1 4217566 | 3/1993 | Germany . |
| 2235698 | 3/1991 | United Kingdom . |
| 2245318 | 1/1992 | United Kingdom . |
| 2259711 | 3/1993 | United Kingdom . |

OTHER PUBLICATIONS

Translation of NSK Kugellager GmbH, Hauptkatalog, Katalog 7310, Dusseldorf, Aug. 1973.
Translation of SKF Hauptkatalog, Katalog 2800 T/Dd 6000, Aug. 1971.
Translation of Beitz, W. and K. H. Kuttner, "Taschenbuch fur den Maschinenbau", pp. 281–282, 1983.

Primary Examiner—Deborah Yee
Attorney, Agent, or Firm—Sughrue, Mion, Zinn, Macpeak & Seas, PLLC

[57] ABSTRACT

A water-resistant and long-life rolling bearing used in an environment involving water's seeping in the lubricant thereof, wherein at least one of the inner race, the outer race, and the rolling member is formed of alloy steel containing 0.05 to 0.60% by weight of Cu, 0.10 to 1.10% by weight of C, and 0 to 0.2% by weight of Nb or V. The alloy steel has functions of reducing hydrogen evolution on the surface thereof and of forming a film hardly permeable to hydrogen thereby to retard occurrence of flaking due to hydrogen-induced brittleness.

4 Claims, 5 Drawing Sheets

WATER-RESISTANT LONG-LIFE ROLLING BEARING

FIELD OF THE INVENTION

This invention relates to a water-resistant long-life rolling bearing and more particularly to a rolling bearing which had a long duration of life even if water seeps in the lubricant of the bearing and is suitable for use as a roll neck bearing of a rolling mill, a water pump bearing for an automobile engine, etc.

BACKGROUND OF THE INVENTION

In general, the durability of a rolling bearing is reduced if water enters the lubricant. For example, incorporation of as little as 100 ppm of water into the lubricant causes a reduction in bearing life by 32 to 48% (see Schatzberg, P. and Felsen, I. M., Wear, Vol. 12, pp. 331–342, "Effects of water and oxygen during rolling contact lubrication" (1968) and Schatzberg, P. and Felsen, I. M., Journal of Lubrication Technology, ASME Trans. F, 91, 2, pp. 301–307, "Influence of water on fatigue failure location and surface alteration during rolling contact lubrication" (1969)).

Therefore, a bearing used in an environment involving contact with water, such as a roll neck bearing of a rolling mill or a water pump bearing, should be given a countermeasure for sealing out water so as to avoid reduction of life. For example, JP-B-55-22648 (the term "JP-B" as used herein means an "examined published Japanese patent application") discloses a roll neck bearing for a rolling mill with its both sides sealed by a contact seal, such as an oil seal, and JP-A-59-223103 (the term "JP-A" as used herein means an "unexamined published Japanese patent application") discloses a bearing with its both sides sealed by a noncontact seal having a narrow bent gap.

The sealing structures disclosed have achieved improved sealing properties over conventional countermeasures but are still insufficient in view of the duration of life of a bearing. That is, the bearing having a contact seal cannot completely prevent water from seeping in when the temperature of the bearing drops because air within the bearing contracts and sucks in outside water. The bearing with a noncontact seal still cannot get rid of the problem of water's seeping in through the gap of the seal.

Seeing that the presence of only a little water as 100 ppm in the lubricant greatly influences the life of a bearing as stated above, any seal would produce no effect unless incorporation of water is completely prevented.

Since it has been unknown why existence of water causes such a significant reduction in bearing life (see Ioanniedes, E. and Jacobson, B., Ball Bearing Journal, Special '89, pp. 22–27 "Dirty lubricants-reduced bearing life" (1989)), it has been difficult to take a radical measure to extend the bearing life from the standpoint of material. Attempts to prevent water's seeping in have therefore been confined to superficial measures for improvement on the performance of a seal.

SUMMARY OF THE INVENTION

The present invention has been completed with the attention paid to the above-described problem of the conventional techniques. Accordingly, an object of the present invention is to provide a water-resistant and long-life rolling bearing which has a long life even in an environment allowing water to seep in the lubricant by using a material having excellent functions of reducing hydrogen evolution mainly on the surface of steel and of forming a film hardly permeable to hydrogen to reduce hydrogen coming into steel thereby retarding occurrence of flaking due to hydrogen-induced brittleness.

The inventors of the present invention have studied the influences of water on rolling fatigue of a rolling bearing and as a result revealed the following mechanism.

(1) Hydrogen evolved through corrosion reaction enters, in its atomic state, through boundaries of former austenite crystal grains on the raceway of a bearing and is diffused through the grain boundaries and becomes hydrogen molecules, i.e., changes into hydrogen gas in the interstices among non-metallic inclusions crossing the former austenite crystal grain boundaries and a matrix material.

(2) As the amount of hydrogen gas increases, the inner pressure of the interstices increases. When rolling members pass over the interstices, the inner pressure increases further. Such being the case, cracks initiate almost parallel to the raceway as if to expand the interstices thereby to decrease the hydrogen gas pressure.

(3) Meanwhile, the amount of hydrogen gas increases again, and the cracks develop further to decrease the pressure in the interstices.

(4) While the rises and falls of pressure in the interstices alternate, the cracks keep on developing, finally causing flaking. Because of repetition of crack development in this way, the fracture due to flaking exhibits a pattern like annular rings having an oxide inclusion in the center. In many cases, the non-metallic inclusion that has acted as a starting point of cracking falls off upon occurrence of flaking and is difficult to detect.

In the present invention, such a flaking phenomenon of a bearing is called "hydrogen-induced brittleness flaking". While general flaking occurs taking part of non-metallic inclusions having a minimum given size as a starting point of initial flaking, hydrogen-induced brittleness flaking takes place from all the countless non-metallic inclusions as a starting point. Even through the countless non-metallic inclusions could be reduced to half in number, there would still remain a great number of nonmetallic inclusions so that it is impossible to extend the bearing life by highly purifying the material steel.

The inventors have reached the present invention based on the thus revealed mechanism.

The invention provides a rolling bearing used in an environment involving water's seeping in the lubricant thereof, wherein at least one of the inner race, the outer race, and the rolling member (rolling elements) is made of alloy steel containing 0.05 to 0.60% by weight of Cu, 0.10 to 1.10% by weight of C, and 0 to 0.2% by weight of Nb or V.

DETAILED DESCRIPTION OF THE INVENTION

The alloy steel used in the invention essentially contains 0.05 to 0.60% by weight of Cu. Cu suppresses corrosion of steel to reduce hydrogen evolution on the surface of steel and also forms a film hardly permeable to hydrogen, serving to reduce the amount of hydrogen entering the steel. Therefore, Cu is extremely effective in retarding occurrence of hydrogen-induced brittleness flaking. If the Cu content is less than 0.05%, no substantial effect is produced. If its exceeds 0.60%, the alloy steel has reduced hot-processability.

The alloy steel used in the invention essentially contains 0.10 to 1.10% by weight of C. If the C content is less than 0.10%, too much time is required for carburizing (or carbonitriding), which is unfavorable for productivity. If the C content exceeds 1.10%, the bearing has reduced dimensional stability.

The alloy steel used in the invention preferably contains up to 0.20% by weight of Nb or V or contains both Nb and V in a total amount of not more than 0.20% by weight. Nb or V functions to make former austenite crystal grains finer thereby providing more grain boundaries where hydrogen atoms can pass through. It follows that hydrogen gas is delivered to many inclusions, which is effective in retarding hydrogen-induced brittleness flaking. Although the similar effect might be produced by other elements having the same function, such as Al and N, addition of Nb or V brings about better results in terms of water resistant life of a bearing. The upper limit of the Nb or V content is 0.2% from the economical consideration.

In a preferred embodiment of the invention, the alloy steel contains 0.030 to 0.150% by weight of P, 0.020 to 0.060% by weight of Al, and 0.005 to 0.015% by weight of N.

P functions similarly to Cu. That is, it suppresses corrosion of steel to reduce hydrogen evolution on the surface of steel and also forms a film hardly permeable to hydrogen, serving to reduce the amount of hydrogen entering the steel. Therefore, P is extremely effective in retarding occurrence of hydrogen-induced brittleness flaking. A P content less than 0.030% produces insubstantial effect. If the P content exceeds 0.150%, the steel tends to become too brittle for use as a bearing material. From the standpoint of equipment cost, the upper limit of the P content is preferably 0.025% by weight.

Al functions to make former austenite crystal grains finer similarly to Nb and V, thereby providing more grain boundaries where hydrogen atoms can pass through. It follows that hydrogen gas is delivered to many inclusions, which is effective in retarding hydrogen-induced brittleness flaking. An Al content less than 0.020% produces insubstantial effect. Al contents exceeding 0.060% bring no further improvement, only resulting in an increase of cost.

N also functions to make former austenite crystal grains finer similarly to Al, Nb and V, thereby providing more grain boundaries where hydrogen atoms can pass through. It follows that hydrogen gas is delivered to many inclusions, which is effective in retarding hydrogen-induced brittleness flaking. An N content less than 0.005% produces insubstantial effect. N contents exceeding 0.015% bring no further improvement, only resulting in an increase of cost.

In another preferred embodiment of the invention, the alloy steel contains 0.15 to 1.10% by weight of Si, 0.35 to 1.50% by weight of Mn, and 0.35 to 3.5% by weight of Cr.

Si is added as a deoxidizer in steel manufacturing. At an Si content of less than 0.15%, no deoxidizing effect is exerted. An Si content more than 1.10% causes unevenness in carburizing (or carbonitriding), failing to obtain sufficient hardness in places. In order to uniformly conduct the heat processing for carburizing (or carbonitriding) to obtain uniform hardness in the surface layer, the Si content is preferably not more than 0.5% by weight.

The alloy steel according to the present invention may further contain not more than 1.10% by weight of Mo, not more than 4.5% by weight of Ni, not more than 0.008% by weight of S, and not more than 0.0015% by weight of O.

Mn, Cr, Mo, and Ni as above referred to can each be added for securing hardenability. If the Mn content is less than 0.35%, the effect for securing hardenability is insufficient. If the Mn content exceeds 1.5%, an abnormal structure due to segregation appears, causing cracks during production. If the Cr content is less than 0.35%, the effect for securing hardenability is insufficient. If the Cr content exceeds 3.5%, carburizing (or carbonitriding) proceeds unevenly, failing to obtain sufficient hardness in places.

Mo and Ni do not always need to be added. If the Mo content exceeds 1.10% by weight or if the Ni content exceeds 4.50% by weight, an abnormal structure due to segregation appears, causing cracks during production.

S and O in the alloy steel of the present invention are harmful elements which are unavoidably incorporated into alloy steel. That is, S forms sulfide inclusions, and O forms oxide inclusions, both accelerating rolling fatigue. While it is desirable to minimize these contents, the upper limits of the S content and the O content are set at 0.008% and 0.0015%, respectively, from the economical viewpoint.

The alloy steel according to the present invention is preferably produced by a vacuum arc remelting (hereafter abbreviated as a VAR) method or an electro-slag remelting (hereinafter abbreviated as ESR) method. Alloy steel obtained by these methods has a uniform structure with reduced segregation and is therefore free from local cells and resistant to corrosion. Accordingly, hydrogen evolution on the steel surface can be reduced, which is effective in retarding occurrence of hydrogen-induced brittleness flaking.

As hereinabove described, at least one of the constituent members of a rolling bearing of the present invention, i.e., the inner race, the outer race, and the rolling member (rollers) is made of alloy steel having a controlled composition so that the hydrogen evolution on the surface of the steel may be reduced and a film hardly permeable to hydrogen may be formed on the steel surface thereby to reduce the amount of hydrogen entering the steel. The present invention thus provides a water-resistant rolling bearing that has a long life even when used in such an environment that may involve incorporation of water into the lubricant of the bearing.

PREFERRED EMBODIMENTS OF THE INVENTION

Bearings according to the present invention (conical rolling bearings) and comparative bearings were produced from alloy steel having various compositions according to the following specifications and tested by a bearing life test in accordance with the test method described below.

Specifications:
  Bearing designation: HR32017XJ
  Inner diameter: 85 mm
  Outer diameter: 130 mm
  Assembled bearing width: 29 mm
  Basic dynamic load rating: 143000 N
Properties of Bearing:
  Surface hardness: HRC 58 to 64
  Surface residual austenite: 20 to 45 vol %

Carburized bearing:
  surface carbon concentration: 0.8 to 1.1 wt %
Carbonitrided bearing:
  surface carbon concentration: 0.8 to 1.1 wt %
  surface nitrogen concentration: 0.05 to 0.3 wt %

Figure 1:
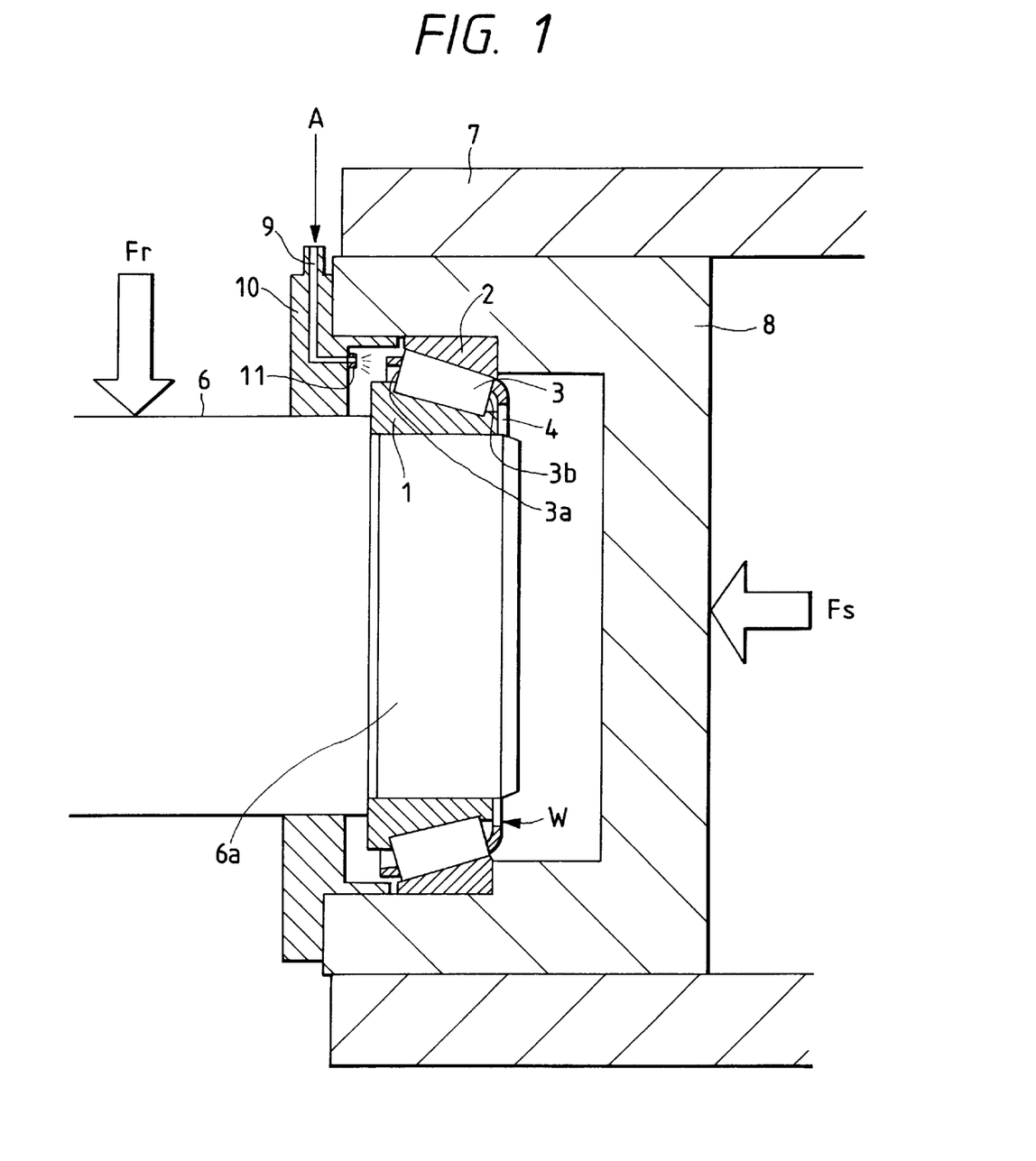
FIG. 1 is a partial enlarged view of a tester for testing the life of a rolling bearing.

Test Method:

The life test was performed by use of the tester shown in FIG. 1. An inner race 1 of a conical rolling bearing (work) W is fitted into a bearing seat 6a, one end of a rotating shaft 6, to set the work W on the tester. An outer race 2 is fitted into an internal bearing holder 8 of a housing 7. An annular lid 10 having a water channel 9 is fitted to the end of the internal bearing holder 8. At the outlet of the water channel 9 is provided a spray 11 facing the wider base 3a of the conical roller 3. Water is injected into the water channel 9 as indicated by the arrow A. A radial load Fr is applied to the rotating shaft 6 by a loading means (not shown) to impose the radical load to the work W. An axial load Fs is applied to the internal bearing holder 8 by a hydraulic cylinder (not shown) to impose the axial load to the work W.

The conditions of the life test in Examples 1 to 3 were as follows.

Radial load: 35750 N
  Axial load: 15680 N
  Speed of revolution of inner race: 1500 rpm
  Lubrication:
    a) lubricated with 60 g of grease
    b) lubricated with 60 g of grease in the presence of 3 cc/hr of water (sprayed along with air onto the bearing).

The 10% life $L_{10}$ (90% life remaining) of a bearing in the absence of water and that of the same bearing in the presence of water were obtained to calculate a rate of life reduction due to incorporation of water according to equation (1). The lower the rate of life reduction, the more water-resistant and long-life is the bearing.

Rate of life reduction (%)=[($L_{10}$ in the absence of water)−($L_{10}$ in the presence of water)]/($L_{10}$ in the absence of water)×100   (1)

For steel making, the following methods were adopted.

(1) Furnace:

An electric furnace or a converter was used. In an electric furnace scrap is smelted by the heat of an arc discharge. In a converter the temperature is raised to a prescribed temperature by making use of the heat of reaction between blown oxygen and elements in molten iron to conduct smelting. These furnaces have the same functions of decarburization, dephosphorization, removal of silicon, removal of manganese, and desulfurization. Ferroalloy is added to the stream of molten steel at the time of transfer to a ladle to adjust the composition near to the final composition.

(2) Ladle Furnace (LF):

Deoxidation, desulfurization, and fine adjustment of alloy elements are conducted.

(3) RH Degassing:

Deoxidation, dehydrogenation, and fine adjustment of alloy elements are conducted.

Replacement of (2) and (3) with ASEA-SKF (a vacuum refining apparatus) or VAD (an arc degassing apparatus) gives no influence on the effects of the invention.

(4) Ingot Formation or Continuous Casting:

Molten steel is allowed to set in an ingot case or by means of a continuous casting machine. It gives no influence on the effects of the invention which is adopted. The resulting ingot is then subjected to remelting.

(5) VAR Method or ESR Method:

The ingot is put in a Cu-made crucible in a non-contact state. A voltage is applied between the ingot and the crucible to remelt the ingot by the heat of an arc discharge. The technique in which the upper layer of the melt in the crucible is slag (oxides) is called an ESR method, while the technique in which the atmosphere above the melt is vacuum is called a VAR method.

EXAMPLE 1

The influence of the Cu content of the alloy steel on the water-resistant bearing life was examined. In order to make a clear distinction between comparative bearings A to J and bearings M to Y according to the invention, the former had a Cu content of less than 0.05 wt % while the latter had a Cu content ranging from 0.05 to 0.60 wt %. The alloy constituents of the steel, the steel making method adopted, the heat processing given to the bearing are shown in Table 1 below. The results of the water-resistant life test are also shown in Table 1.

TABLE 1

| Sample No. | \multicolumn{12}{c|}{Alloy Steel Composition (wt %)} | Method of Steel Making | Heat Processing of Bearing | Rate of Life Reduction (%) |
|---|---|---|---|---|---|---|---|---|---|---|---|---|---|---|---|
| | C | Si | Mn | P | S | Ni | Cr | Mo | Cu | Al | Ti | O | | | |
| Comparative Bearing: | | | | | | | | | | | | | | | |
| A | 0.10 | 0.24 | 0.49 | 0.015 | 0.003 | 4.50 | 1.04 | 0.16 | 0.01 | 0.035 | 0.003 | 0.0015 | electric furnace → LF → RH degassing → ingot formation | carburizing followed by hardening and tempering | 97 |
| B | 0.10 | 0.25 | 0.49 | 0.016 | 0.002 | 4.50 | 1.04 | 0.16 | 0.04 | 0.033 | 0.003 | 0.0006 | electric furnace → LF → RH degassing → ingot formation | carburizing followed by hardening and tempering | 96 |
| C | 0.35 | 0.25 | 0.80 | 0.015 | 0.005 | 0.01 | 1.50 | 1.10 | 0.01 | 0.033 | 0.002 | 0.0013 | electric furnace → LF → RH degassing → ingot formation | carbonitriding followed by hardening and tempering | 96 |

TABLE 1-continued

| | C | Si | Mn | P | S | Ni | Cr | Mo | Cu | Al | Ti | O | Method of Steel Making | Heat Processing of Bearing | Rate of Life Reduction (%) |
|---|---|---|---|---|---|---|---|---|---|---|---|---|---|---|---|
| D | 0.33 | 0.25 | 0.81 | 0.017 | 0.008 | 0.01 | 1.49 | 1.09 | 0.04 | 0.030 | 0.002 | 0.0013 | electric furnace → LF → RH degassing → ingot formation | carbonitriding followed by hardening and tempering | 95 |
| E | 0.21 | 0.16 | 0.40 | 0.019 | 0.005 | 1.58 | 0.35 | 0.22 | 0.01 | 0.034 | 0.003 | 0.0014 | electric furnace → LF → RH degassing → ingot formation | carburizing followed by hardening and tempering | 95 |
| F | 0.22 | 0.15 | 0.40 | 0.019 | 0.005 | 1.60 | 0.35 | 0.21 | 0.04 | 0.032 | 0.003 | 0.0014 | electric furnace → LF → RH degassing → ingot formation | carburizing followed by hardening and tempering | 94 |
| G | 0.45 | 0.50 | 1.50 | 0.019 | 0.005 | 0.01 | 1.26 | 0.01 | 0.01 | 0.029 | 0.003 | 0.0011 | electric furnace → LF → RH degassing → continuous casting | carbonitriding followed by hardening and tempering | 96 |
| H | 0.45 | 0.49 | 1.49 | 0.018 | 0.002 | 0.02 | 1.25 | 0.01 | 0.04 | 0.029 | 0.003 | 0.0011 | electric furnace → LF → RH degassing → continuous casting | carbonitriding followed by hardening and tempering | 94 |
| I | 1.09 | 0.24 | 0.35 | 0.016 | 0.001 | 0.06 | 3.50 | 0.01 | 0.01 | 0.025 | 0.002 | 0.0004 | electric furnace → LF → RH degassing → ingot formation | hardening and tempering | 97 |
| J | 1.10 | 0.24 | 0.36 | 0.016 | 0.007 | 0.06 | 3.50 | 0.01 | 0.04 | 0.022 | 0.002 | 0.0012 | electric furnace → LF → RH degassing → ingot formation | hardening and tempering | 95 |

| Sample No. | Alloy Constituents (wt %) | | | | | | | | | | | | Method of Steel Making | Heat Processing of Bearing | Rate of Life Reduction (%) |
|---|---|---|---|---|---|---|---|---|---|---|---|---|---|---|---|
| | C | Si | Mn | P | S | Ni | Cr | Mo | Cu | Al | Ti | O | | | |
| Bearing of Invention: | | | | | | | | | | | | | | | |
| M | 0.10 | 0.24 | 0.49 | 0.011 | 0.008 | 4.50 | 1.04 | 0.16 | 0.20 | 0.035 | 0.003 | 0.0005 | electric furnace → LF → RH degassing → ingot formation | carburizing followed by hardening and tempering | 55 |
| N | 0.10 | 0.25 | 0.49 | 0.016 | 0.005 | 4.50 | 1.04 | 0.16 | 0.30 | 0.033 | 0.003 | 0.0015 | electric furnace → LF → RH degassing → ingot formation | carburizing followed by hardening and tempering | 53 |
| O | 0.10 | 0.25 | 0.49 | 0.022 | 0.003 | 4.49 | 1.04 | 0.16 | 0.60 | 0.033 | 0.003 | 0.0015 | electric furnace → LF → RH degassing → ingot formation | carburizing followed by hardening and tempering | 50 |
| P | 0.35 | 0.25 | 0.80 | 0.015 | 0.005 | 0.01 | 1.50 | 1.09 | 0.10 | 0.033 | 0.002 | 0.0013 | electric furnace → LF → RH degassing → ingot formation | carbonitriding followed by hardening and tempering | 60 |
| Q | 0.33 | 0.25 | 0.81 | 0.017 | 0.005 | 0.01 | 1.49 | 1.10 | 0.30 | 0.030 | 0.002 | 0.0013 | electric furnace → LF → RH degassing → ingot formation | carbonitriding followed by hardening and tempering | 59 |
| R | 0.21 | 0.16 | 0.40 | 0.019 | 0.004 | 1.58 | 0.35 | 0.22 | 0.25 | 0.034 | 0.003 | 0.0014 | electric furnace → LF → RH degassing → ingot formation | carburizing followed by hardening and tempering | 51 |
| S | 0.22 | 0.15 | 0.40 | 0.019 | 0.005 | 1.60 | 0.36 | 0.21 | 0.40 | 0.032 | 0.003 | 0.0014 | electric furnace → LF → RH degassing → ingot formation | carburizing followed by hardening and tempering | 58 |
| T | 0.45 | 0.50 | 1.50 | 0.019 | 0.007 | 0.01 | 1.26 | 0.01 | 0.05 | 0.029 | 0.003 | 0.0011 | converter → LF → RH degassing → continuous casting | carbonitriding followed by hardening and tempering | 61 |
| U | 0.45 | 0.50 | 1.49 | 0.018 | 0.005 | 0.02 | 1.25 | 0.01 | 0.15 | 0.029 | 0.003 | 0.0011 | electric furnace → LF → RH degassing → continuous casting | carbonitriding followed by hardening and tempering | 59 |
| V | 1.10 | 0.24 | 0.35 | 0.016 | 0.006 | 0.06 | 3.50 | 0.01 | 0.05 | 0.025 | 0.002 | 0.0012 | electric furnace → LF → RH degassing → ingot formation | hardening and tempering | 59 |

TABLE 1-continued

| | | | | | | | | | | | | | | | |
|---|---|---|---|---|---|---|---|---|---|---|---|---|---|---|---|
| W | 1.10 | 0.24 | 0.35 | 0.016 | 0.003 | 0.06 | 3.50 | 0.01 | 0.10 | 0.022 | 0.002 | 0.0012 | electric furnace → LF → RH degassing → ingot formation | hardening and tempering | 53 |
| X | 1.10 | 0.24 | 0.35 | 0.019 | 0.005 | 0.06 | 3.50 | 0.01 | 0.30 | 0.022 | 0.002 | 0.0012 | electric furnace → LF → RH degassing → ingot formation | hardening and tempering | 50 |
| Y | 1.09 | 0.24 | 0.35 | 0.016 | 0.007 | 0.07 | 3.50 | 0.01 | 0.60 | 0.022 | 0.002 | 0.0009 | electric furnace → LF → RH degassing → ingot formation | hardening and tempering | 58 |

Figure 2:
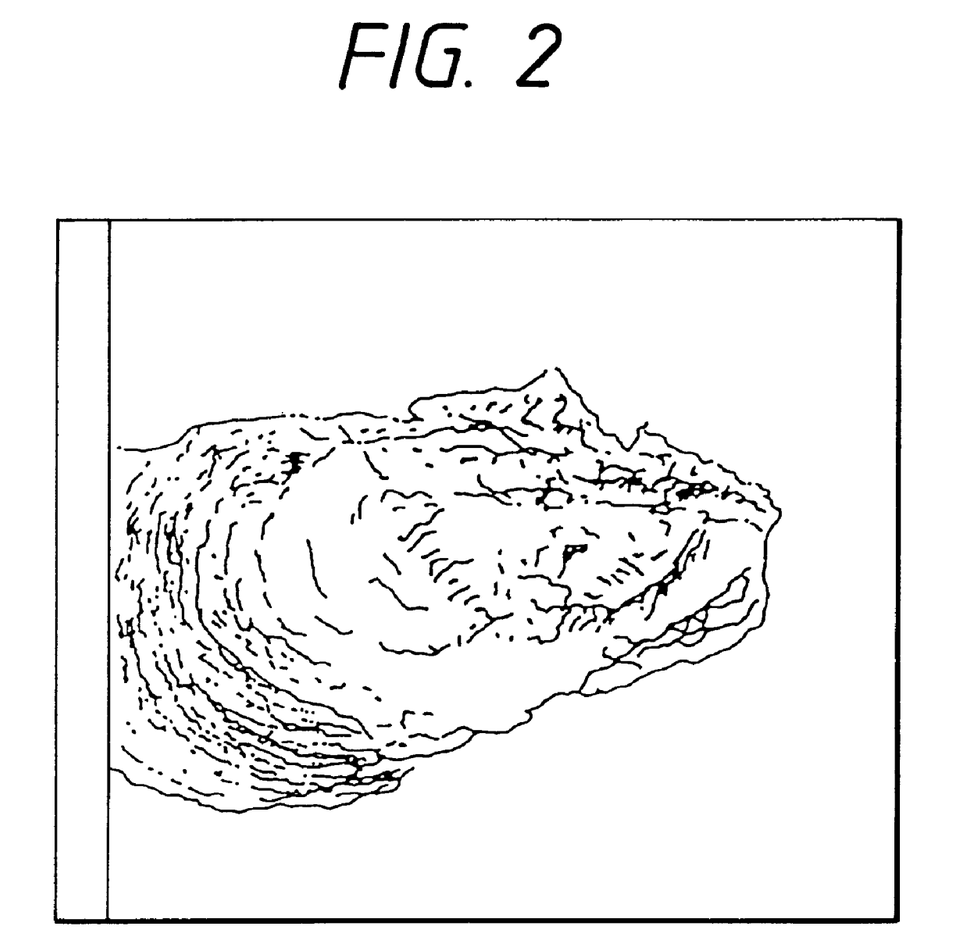
FIG. 2 schematically depicts the flaking pattern of a comparative bearing.

As is apparent from the results in Table 1, the rate of life reduction of bearings M to Y according to the invention is significantly lower than that of comparative bearings A to J, proving that Cu is extremely effective on hydrogen-induced brittleness flaking. As an example of the hydrogen-induced brittleness flaking the flaking pattern of comparative bearing A is shown in FIG. 2. There can be seen a fracture having a pattern like annular rings due to crack development, indicating hydrogen-induced brittleness flaking.

EXAMPLE 2

Bearings were produced from alloy steel containing Nb or V to examine the influence of Nb or V on the rate of life reduction. Specifically, bearings $Q_1$ to $Q_5$ were prepared in the same manner as for bearing Q of Example 1, except for adding Nb or V to the basic alloy steel composition of bearing Q in a varied concentration, and tested in the same manner as in Example 1.

The alloy constituents, the method of steel making, the former austenite crystal grain size, and the test results obtained are shown in Table 2 below. The term "former austenite crystal grain size" as used herein means the crystal grain size of the austenite at the time of heating for carburizing and hardening, which is measured in accordance with JIS G0551. The larger the figure, the finer the grains. Austenite is converted to martensite upon hardening (quenching), but the crystal grains do not grow by hardening. Accordingly, the smaller the former austenite crystal grains, the smaller the martensite crystal grains.

While all the bearings Q to $Q_5$ are in accordance with the present invention, it is seen that addition of Nb or V suppresses the reduction in life due to incorporation of water. Thus, since Nb or V makes the former austenite crystal grains finer thereby to provide more grain boundaries through which hydrogen atoms are allowed to pass. As a result, hydrogen gas is broadly delivered to as many inclusions, and hydrogen-induced brittleness flaking is retarded effectively.

EXAMPLE 3

Bearings were produced in the same manner as in Example 1 by using alloy steel containing Cu and Nb or V in varied concentrations through various methods of steel making to examine the total influence of the method of steel making on the rate of bearing life reduction.

Specifically, comparative bearings $C_1$ to $C_3$ were prepared in the same manner as for comparative bearing C (Cu content: 0.01 wt %) prepared in Example 1, except for adding 0.15 wt % of Nb (bearing $C_1$), adding 0.15 wt % of V (bearing $C_2$), or increasing the Cu content to 0.04 wt % and adding 0.15 wt % of V (bearing $C_3$). Bearings $C_4$ to $C_8$ according to the present invention were prepared in the same manner except for increasing the Cu content to a range of from 0.05 to 0.25 wt % and adding Nb or V in a concentration varying from 0 to 0.15 wt %. The alloy steel for these bearings was prepared by remelting according to a VAR method or an ESR method.

The alloy constituents, the method of steel making, and the results of the life test are shown in Table 3 below.

TABLE 2

| Sample No. | Alloy Constituents (wt %) | | | | | | | | | | | | | | Method of Steel Making | Heat Processing of Bearing | Former Austenite Grain Size | Rate of Life Reduction (%) |
|---|---|---|---|---|---|---|---|---|---|---|---|---|---|---|---|---|---|---|
| | C | Si | Mn | P | S | Ni | Cr | Mo | Cu | Al | Ti | O | Nb | V | | | | |
| Q | 0.33 | 0.25 | 0.81 | 0.017 | 0.005 | 0.01 | 1.49 | 1.10 | 0.30 | 0.030 | 0.002 | 0.0013 | 0.00 | 0.00 | electric furnace ↓ LF ↓ RH degassing ↓ ingot formation | carbonitriding followed by hardening and tempering | 7 | 59 |
| $Q_1$ | 0.35 | 0.25 | 0.80 | 0.022 | 0.008 | 0.01 | 1.45 | 1.09 | 0.30 | 0.029 | 0.002 | 0.0011 | 0.05 | 0.00 | | | 9 | 49 |
| $Q_2$ | 0.35 | 0.24 | 0.80 | 0.012 | 0.003 | 0.02 | 1.48 | 1.10 | 0.30 | 0.031 | 0.002 | 0.0013 | 0.10 | 0.00 | | | 9 | 48 |
| $Q_3$ | 0.35 | 0.24 | 0.81 | 0.015 | 0.006 | 0.01 | 1.49 | 1.09 | 0.29 | 0.027 | 0.002 | 0.0010 | 0.20 | 0.00 | | | 9 | 47 |
| $Q_4$ | 0.34 | 0.25 | 0.81 | 0.019 | 0.006 | 0.01 | 1.49 | 1.10 | 0.29 | 0.033 | 0.002 | 0.0008 | 0.00 | 0.10 | | | 9 | 47 |
| $Q_5$ | 0.32 | 0.27 | 0.79 | 0.009 | 0.001 | 0.01 | 1.50 | 1.07 | 0.31 | 0.034 | 0.002 | 0.0010 | 0.00 | 0.15 | | | 9 | 47 |

TABLE 3

| Sample No. | \multicolumn{14}{c}{Alloy Constituents (wt %)} | Method of Steel Making | Heat Processing of Bearing | Rate of Life Reduction (%) |
| --- | --- | --- | --- | --- | --- | --- | --- | --- | --- | --- | --- | --- | --- | --- | --- | --- | --- |
| | C | Si | Mn | P | S | Ni | Cr | Mo | Cu | Al | Ti | O | Nb | V | | | |
| Comparative Bearing: | | | | | | | | | | | | | | | | | |
| C | 0.35 | 0.25 | 0.80 | 0.015 | 0.005 | 0.01 | 1.50 | 1.10 | 0.01 | 0.033 | 0.002 | 0.0013 | 0.00 | 0.00 | electric furnace → LF → ingot formation → VAR | carburizing (or carbo-nitriding) followed by hardening and tempering | 96 |
| $C_1$ | 0.33 | 0.25 | 0.80 | 0.010 | 0.002 | 0.01 | 1.50 | 1.10 | 0.01 | 0.033 | 0.002 | 0.0004 | 0.15 | 0.00 | electric furnace → LF → RH degassing → ingot formation → VAR | | 96 |
| $C_2$ | 0.35 | 0.25 | 0.80 | 0.024 | 0.004 | 0.01 | 1.50 | 1.10 | 0.01 | 0.033 | 0.002 | 0.0015 | 0.00 | 0.15 | electric furnace → LF → ingot formation → ESR | | 95 |
| $C_3$ | 0.35 | 0.25 | 0.80 | 0.023 | 0.008 | 0.01 | 1.50 | 1.10 | 0.04 | 0.030 | 0.002 | 0.0014 | 0.00 | 0.15 | electric furnace → LF → ingot formation → ESR | | 95 |
| Bearing of the Invention: | | | | | | | | | | | | | | | | | |
| $C_4$ | 0.35 | 0.25 | 0.83 | 0.015 | 0.005 | 0.01 | 1.49 | 1.10 | 0.05 | 0.030 | 0.002 | 0.0015 | 0.00 | 0.00 | electric furnace → LF → ingot formation → ESR | carburizing (or carbo-nitriding) followed by hardening and tempering | 30 |
| $C_5$ | 0.35 | 0.25 | 0.79 | 0.025 | 0.008 | 0.01 | 1.47 | 1.09 | 0.10 | 0.030 | 0.002 | 0.0013 | 0.05 | 0.00 | electric furnace → LF → ingot formation → VAR | | 28 |
| $C_6$ | 0.35 | 0.25 | 0.80 | 0.019 | 0.005 | 0.01 | 1.48 | 1.10 | 0.25 | 0.030 | 0.002 | 0.0012 | 0.00 | 0.05 | electric furnace → LF → RH degassing → ingot formation → ESR | | 27 |
| $C_7$ | 0.35 | 0.25 | 0.78 | 0.012 | 0.001 | 0.01 | 1.50 | 1.09 | 0.25 | 0.030 | 0.002 | 0.0014 | 0.00 | 0.15 | electric furnace → LF → ingot formation → VAR | | 24 |
| $C_8$ | 0.35 | 0.25 | 0.81 | 0.017 | 0.002 | 0.01 | 1.46 | 1.10 | 0.25 | 0.030 | 0.002 | 0.0014 | 0.15 | 0.00 | electric furnace → LF → ingot formation → ESR | | 23 |

In Table 3, the rates of life reduction of bearings $C_4$ to $C_8$ are significantly lower than those of comparative bearings C to $C_3$ and even considerably lower than those of bearings M to Y and Q to $Q_5$ according to the present invention shown in Tables 1 and 2. From these results it is seen that a VAR method or an ESR method as a steel making method is very effective on hydrogen-induced brittleness flaking provided that the alloy steel contains at least 0.05 wt % of Cu. This is because these remelting methods provide steel which has a metallurgically uniform structure with reduced segregation and therefore has improved corrosion resistance. Such steel undergoes reduced evolution of hydrogen on the surface thereof and thereby retards occurrence of hydrogen-induced brittleness flaking.

Figure 3:
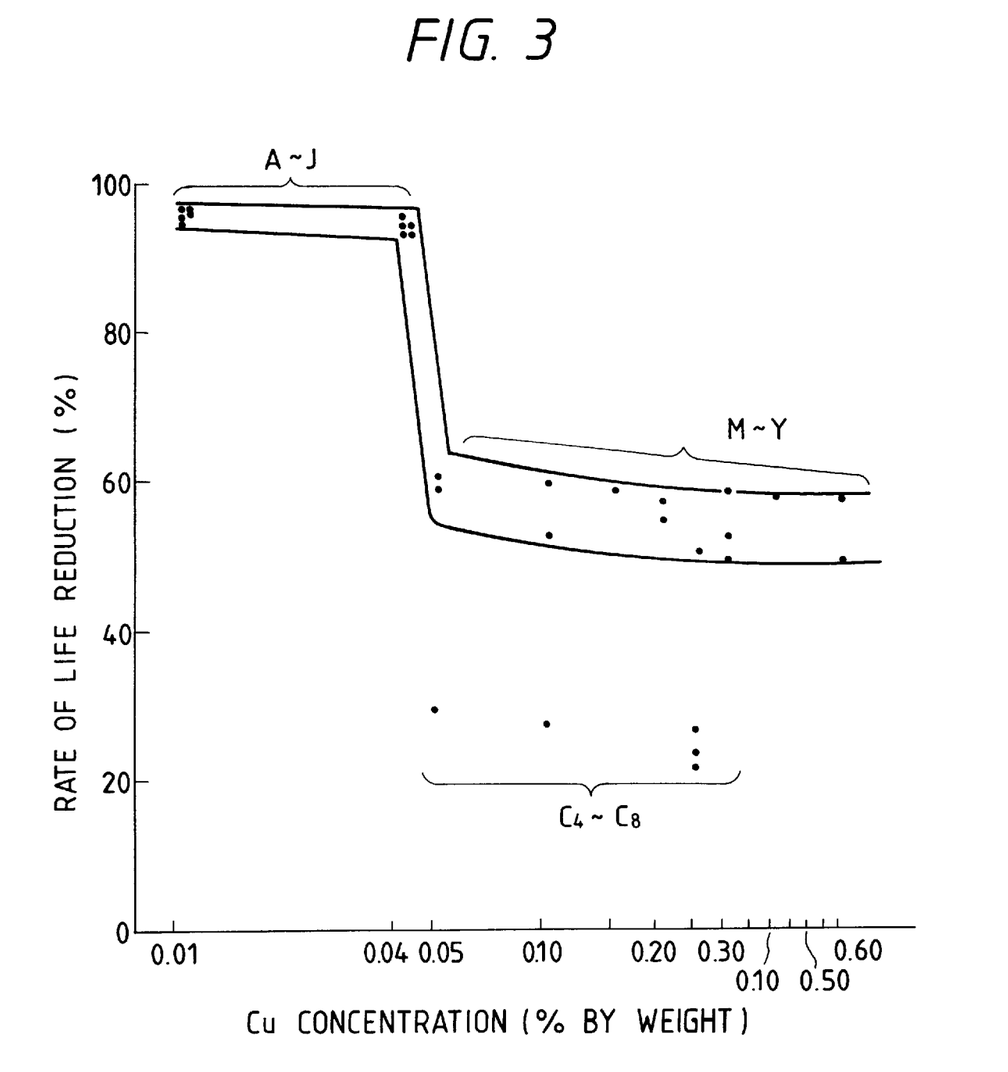
FIG. 3 is a graph of rate of life reduction vs. Cu concentration of an outer race.

FIG. 3 is the plot of rate of life reduction vs. Cu concentration in the alloy steel used in the invention. A–J, M–Y, and $C_4$ to $C_8$ indicate the bearings prepared above. FIG. 3 clearly shows that it makes a dramatic difference in rate of life reduction whether the Cu concentration is less or not less than 0.05 wt %.

If the Cu content is 0.04 wt % or less, no effect on hydrogen-induced brittleness flaking is recognized even if the alloy steel contains Nb or V or even if a VAR method or an ESR method is adopted, as can be concluded from the results of comparative bearings C to $C_3$. In addition, if there is no difference in Cu content (Cu content being fixed at 0.25 wt %), the rate of life reduction tends to be lowered according as the Nb or V content increases, as can be seen from the results of bearings $C_6$ to $C_8$.

Comparative bearing $C_1$ was designed to aim at reduction in rate of life reduction through purification of raw material, i.e., reduction of oxygen and sulfur concentrations. However, no effect was exerted in the presence of water.

In Examples 4 to 7 hereinafter described, bearings were produced in the same manner as in Examples 1 to 3, except for replacing Ti as an alloy constituent with N, and tested under the same conditions as in Examples 1 and 3, except for increasing the radial load to 40000 N and the axial load to 17544 N.

When the water-resistant life test is conducted under the above conditions, because the condition of stress corrosion becomes the strictest on the stress-loaded site (part subjected to highest load) of the outer race, it is the outer race that suffers damage. Therefore, all the bearings tested, either comparative bearings or the bearings of the invention, had a common inner race and common conical rollers. Specifically, all the inner races were the same as in sample $C_0$ shown in Table 4 below and all the rollers were the same as in sample $G_0$ shown in Table 4 in terms of material, method of steel making, and heat processing.

EXAMPLE 4

The influence of Cu and P contents on the water-resistant bearing life was examined. In order to make a clear distinction between comparative bearings and the bearings of the invention, the Cu content of comparative bearings ($A_0$ to $L_0$) was set less than 0.05 wt %, while that of bearings of the invention ($M_1$ to $Y_1$) was in the range of from 0.05 to 0.60 wt %. On the other hand, the P content of the former ranged from 0.015 to 0.030 wt %, while that of the latter ranged from 0.030 to 0.150 wt %.

The alloy constituents, the method of steel making and the heat processing of the outer race, and the results of the life test are shown in Tables 4 and 5 below.

TABLE 4

| Sample No. | \multicolumn{12}{c}{Alloy Steel Composition (wt %)} | Method of Steel Making | Heat Processing of Bearing | Rate of Life Reduction (%) |
|---|---|---|---|---|---|---|---|---|---|---|---|---|---|---|---|
| | C | Si | Mn | P | S | Ni | Cr | Mo | Cu | Al | N | O | | | |
| Comparative Bearing: | | | | | | | | | | | | | | | |
| $A_0$ | 0.10 | 0.24 | 0.49 | 0.015 | 0.003 | 4.50 | 1.04 | 0.16 | 0.01 | 0.035 | 0.010 | 0.0015 | electric furnace → LF → RH degassing → ingot formation | carburizing followed by hardening and tempering | 97 |
| $B_0$ | 0.10 | 0.25 | 0.49 | 0.016 | 0.002 | 4.50 | 1.04 | 0.16 | 0.04 | 0.033 | 0.010 | 0.0006 | electric furnace → LF → RH degassing → ingot formation | carburizing followed by hardening and tempering | 96 |
| $C_0$ | 0.35 | 0.25 | 0.80 | 0.015 | 0.005 | 0.01 | 1.50 | 1.10 | 0.01 | 0.033 | 0.010 | 0.0013 | electric furnace → LF → RH degassing → ingot formation | carbonitriding followed by hardening and tempering | 96 |
| $D_0$ | 0.33 | 0.25 | 0.81 | 0.017 | 0.008 | 0.01 | 1.49 | 1.09 | 0.04 | 0.030 | 0.010 | 0.0013 | electric furnace → LF → RH degassing → ingot formation | carbonitriding followed by hardening and tempering | 95 |
| $E_0$ | 0.21 | 0.16 | 0.40 | 0.019 | 0.005 | 1.58 | 0.35 | 0.22 | 0.01 | 0.034 | 0.010 | 0.0014 | electric furnace → LF → RH degassing → ingot formation | carburizing followed by hardening and tempering | 95 |
| $F_0$ | 0.22 | 0.15 | 0.40 | 0.019 | 0.005 | 1.60 | 0.35 | 0.21 | 0.04 | 0.032 | 0.010 | 0.0014 | electric furnace → LF → RH degassing → ingot formation | carburizing followed by hardening and tempering | 94 |

TABLE 4-continued

| Sample No. | Alloy Steel Composition (wt %) | | | | | | | | | | | | Method of Steel Making | Heat Processing of Bearing | Rate of Life Reduction (%) |
|---|---|---|---|---|---|---|---|---|---|---|---|---|---|---|---|
| | C | Si | Mn | P | S | Ni | Cr | Mo | Cu | Al | N | O | | | |
| $G_0$ | 0.45 | 0.50 | 1.50 | 0.019 | 0.005 | 0.01 | 1.26 | 0.01 | 0.01 | 0.029 | 0.010 | 0.0011 | electric furnace → LF → RH degassing → continuous casting | carbonitriding followed by hardening and tempering | 96 |
| $H_0$ | 0.45 | 0.49 | 1.49 | 0.018 | 0.002 | 0.02 | 1.25 | 0.01 | 0.04 | 0.029 | 0.010 | 0.0011 | electric furnace → LF → RH degassing → continuous casting | carbonitriding followed by hardening and tempering | 94 |
| $I_0$ | 1.09 | 0.24 | 0.35 | 0.016 | 0.001 | 0.06 | 3.50 | 0.01 | 0.01 | 0.025 | 0.010 | 0.0004 | electric furnace → LF → RH degassing → ingot formation | hardening and tempering | 97 |
| $J_0$ | 1.10 | 0.24 | 0.36 | 0.016 | 0.007 | 0.06 | 3.50 | 0.01 | 0.04 | 0.022 | 0.010 | 0.0012 | electric furnace → LF → RH degassing → ingot formation | hardening and tempering | 95 |
| $K_0$ | 0.10 | 0.24 | 0.49 | 0.029 | 0.003 | 4.50 | 1.04 | 0.16 | 0.01 | 0.035 | 0.010 | 0.0015 | electric furnace → LF → RH degassing → ingot formation | carburizing followed by hardening and tempering | 80 |
| $L_0$ | 0.10 | 0.24 | 0.49 | 0.030 | 0.003 | 4.50 | 1.04 | 0.16 | 0.04 | 0.035 | 0.010 | 0.0015 | electric furnace → LF → RH degassing → ingot formation | carburizing followed by hardening and tempering | 80 |

TABLE 5

| Sample No. | Alloy Steel Composition (wt %) | | | | | | | | | | | | Method of Steel Making | Heat Processing of Bearing | Rate of Life Reduction (%) |
|---|---|---|---|---|---|---|---|---|---|---|---|---|---|---|---|
| | C | Si | Mn | P | S | Ni | Cr | Mo | Cu | Al | N | O | | | |
| Bearing of the Invention: | | | | | | | | | | | | | | | |
| $M_1$ | 0.10 | 0.24 | 0.49 | 0.030 | 0.008 | 4.50 | 1.04 | 0.16 | 0.05 | 0.035 | 0.010 | 0.0005 | electric furnace → LF → RH degassing → ingot formation | carburizing followed by hardening and tempering | 55 |
| $N_1$ | 0.10 | 0.25 | 0.49 | 0.030 | 0.005 | 4.50 | 1.04 | 0.16 | 0.30 | 0.034 | 0.010 | 0.0015 | electric furnace → LF → RH degassing → ingot formation | carburizing followed by hardening and tempering | 53 |
| $O_1$ | 0.10 | 0.25 | 0.49 | 0.030 | 0.003 | 4.49 | 1.04 | 0.16 | 0.60 | 0.033 | 0.010 | 0.0015 | electric furnace → LF → RH degassing → ingot formation | carburizing followed by hardening and tempering | 50 |
| $P_1$ | 0.35 | 0.25 | 0.80 | 0.100 | 0.005 | 0.01 | 1.50 | 1.09 | 0.10 | 0.030 | 0.010 | 0.0013 | electric furnace → LF → RH degassing → ingot formation | carbonitriding followed by hardening and tempering | 60 |
| $Q_1$ | 0.33 | 0.25 | 0.81 | 0.100 | 0.005 | 0.01 | 1.49 | 1.10 | 0.30 | 0.030 | 0.010 | 0.0013 | electric furnace → LF → RH degassing → ingot formation | carbonitriding followed by hardening and tempering | 59 |
| $R_1$ | 0.21 | 0.16 | 0.40 | 0.150 | 0.004 | 1.58 | 0.35 | 0.22 | 0.25 | 0.034 | 0.010 | 0.0014 | electric furnace → LF → RH degassing → ingot formation | carburizing followed by hardening and tempering | 51 |
| $S_1$ | 0.22 | 0.15 | 0.40 | 0.150 | 0.005 | 1.60 | 0.36 | 0.21 | 0.40 | 0.032 | 0.010 | 0.0014 | electric furnace → LF → RH degassing → ingot formation | carburizing followed by hardening and tempering | 58 |

TABLE 5-continued

| Sample | Alloy Steel Composition (wt %) | | | | | | | | | | | | Method of Steel Making | Heat Processing of Bearing | Rate of Life Reduction (%) |
| --- | --- | --- | --- | --- | --- | --- | --- | --- | --- | --- | --- | --- | --- | --- | --- |
| No. | C | Si | Mn | P | S | Ni | Cr | Mo | Cu | Al | N | O | | | |
| $T_1$ | 0.45 | 0.50 | 1.50 | 0.060 | 0.007 | 0.01 | 1.26 | 0.01 | 0.05 | 0.029 | 0.010 | 0.0011 | converter → LF → RH degassing → continuous casting | carbonitriding followed by hardening and tempering | 61 |
| $U_1$ | 0.45 | 0.50 | 1.49 | 0.060 | 0.005 | 0.02 | 1.25 | 0.01 | 0.15 | 0.029 | 0.010 | 0.0011 | electric furnace → LF → RH degassing → continuous casting | carbonitriding followed by hardening and tempering | 59 |
| $V_1$ | 1.10 | 0.24 | 0.35 | 0.120 | 0.006 | 0.06 | 3.50 | 0.01 | 0.05 | 0.025 | 0.010 | 0.0012 | electric furnace → LF → RH degassing → ingot formation | hardening and tempering | 59 |
| $W_1$ | 1.10 | 0.24 | 0.35 | 0.120 | 0.003 | 0.06 | 3.50 | 0.01 | 0.10 | 0.022 | 0.010 | 0.0012 | electric furnace → LF → RH degassing → ingot formation | hardening and tempering | 53 |
| $X_1$ | 1.10 | 0.24 | 0.35 | 0.120 | 0.005 | 0.10 | 3.50 | 0.01 | 0.30 | 0.022 | 0.010 | 0.0012 | electric furnace → LF → RH degassing → ingot formation | hardening and tempering | 50 |
| $Y_1$ | 1.09 | 0.24 | 0.35 | 0.120 | 0.007 | 0.30 | 3.50 | 0.01 | 0.60 | 0.022 | 0.010 | 0.0009 | electric furnace → LF → RH degassing → ingot formation | hardening and tempering | 58 |

It can be seen from the results in Tables 4 and 5 that the rates of life reduction of bearings $M_1$ to $Y_1$ according to the invention are markedly lower than those of comparative bearings $A_0$ to $L_0$, proving the significant effect of Cu and P on hydrogen-induced brittleness flaking.

Figure 4:
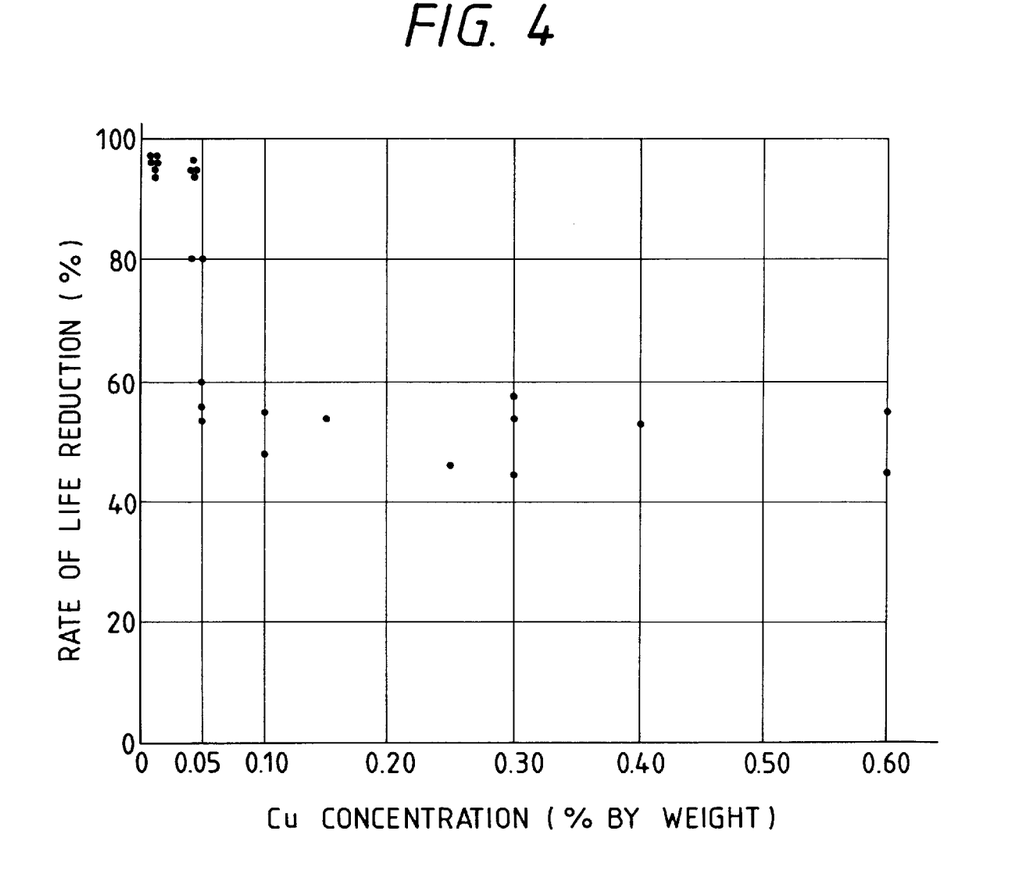
FIG. 4 is a graph of rate of life reduction vs. Cu concentration of an outer race containing Cu and P.
Figure 5:
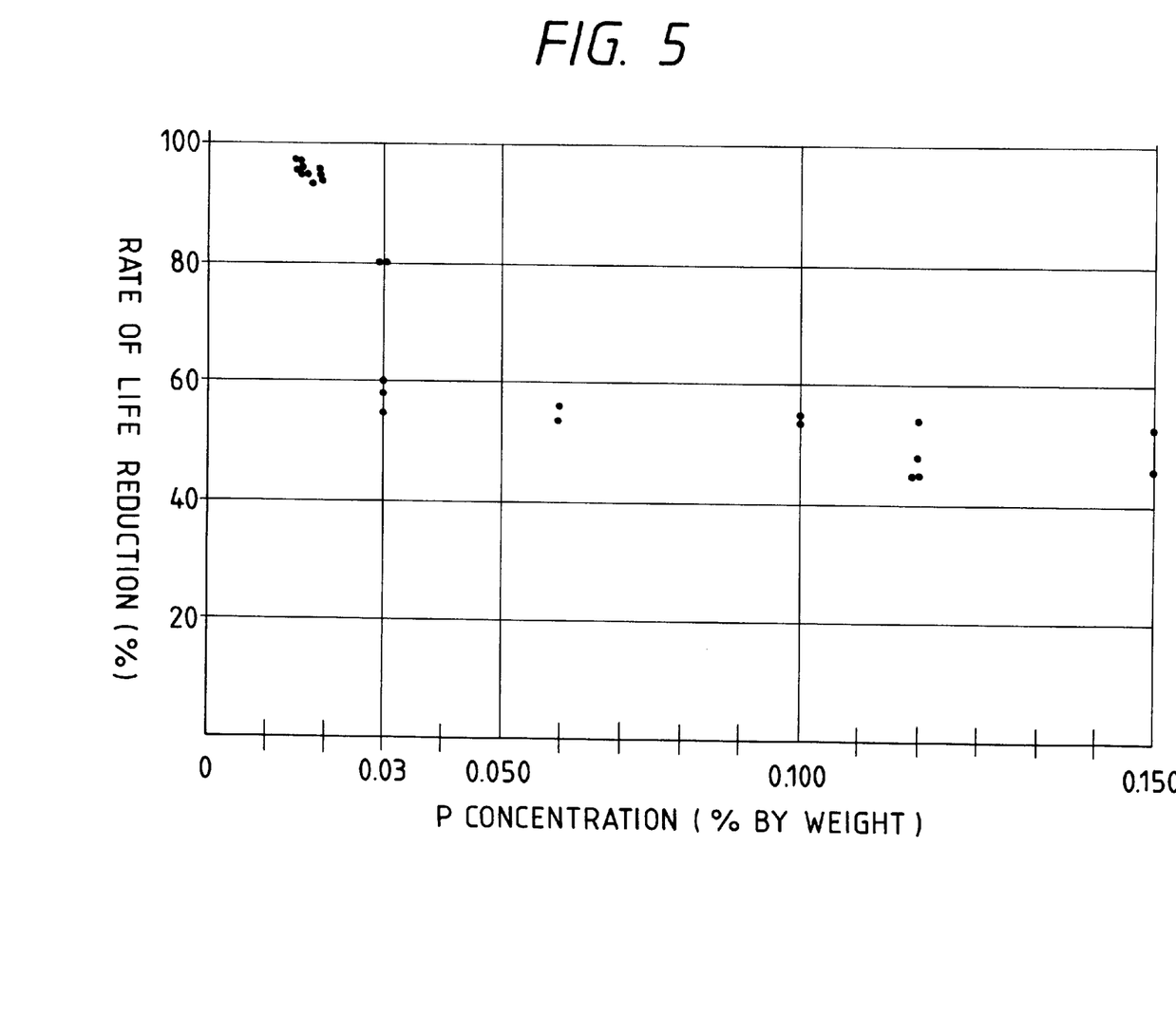
FIG. 5 is a graph of rate of life reduction vs. P concentration of an outer race containing Cu and P.

The plot of rate of life reduction against Cu concentration is shown in FIG. 4, and the plot of rate of life reduction vs. P concentration in FIG. 5. These plots clearly reveal that whether the Cu concentration is less or not less than 0.05 wt % and whether the P concentration is less or not less than 0.030 wt % make a dramatic difference in rate of life reduction. In addition, there figures reveal that the rate of life reduction was almost invariable in the cases where the Cu concentration was in the range of 0.10 to 0.60 wt % or where the P concentration was in the range of 0.04 to 0.150 wt %.

That is, Tables 4 and 5 and FIGS. 4 and 5 show that the bearings of the invention have a significantly reduced rate of life reduction in the presence of water as compared with the comparative bearings, thus proving the great effects of Cu and P on hydrogen-induced brittleness flaking of a bearing.

Table 6 shows the hydrogen concentrations in the stress loaded site (part subjected to highest load) and non-loaded site (part subjected to lowest load) of the outer race after the above life test was conducted for consecutive 70 hours.

TABLE 6

| Outer Race | Hydrogen Concentration After 70-Hour Testing | |
| --- | --- | --- |
| | Stress-loaded Site (ppm) | Stress-Non-loaded Site (ppm) |
| Comparative Bearing $C_0$ | 3.2 | 0.6 |

TABLE 6-continued

| Outer Race | Hydrogen Concentration After 70-Hour Testing | |
| --- | --- | --- |
| | Stress-loaded Site (ppm) | Stress-Non-loaded Site (ppm) |
| Bearing of Invention $P_1$ | 0.9 | 0.6 |

The hydrogen concentration in the stress-loaded site of the outer race of the bearing $P_1$ according to the invention, though higher than in the non-loaded site because of entrance and diffusion of hydrogen therein, is lower than that in the stress-loaded site of the comparative bearing $C_0$. It is thus seen that hydrogen hardly enters and diffuses in the outer race of the bearing of the invention and that Cu and P are effective in preventing hydrogen entrance.

EXAMPLE 5

Bearings $Q_{10}$ to $Q_{15}$ according to the present invention and comparative bearings $Z_1$ and $Z_2$ were produced using alloy steel basically having the same composition as used in bearing $Q_1$ of Example 4 except for containing Al, N, Nb or V in varied concentrations and tested to examine the influences of these elements on the former austenite crystal grain size (JIS G0551) and the rate of life reduction in the presence of water. The alloy constituents, the method of steel making, the heat processing, the former austenite crystal grain size, and the results of the life test are shown in Table 7 below.

TABLE 7

| Sample No. | Alloy Steel Composition (wt %) | | | | | | | | | | | | | | Method of Steel Making | Heat Processing of Bearing | Former Austenite Grain Size | Rate of Life Reduction (%) |
|---|---|---|---|---|---|---|---|---|---|---|---|---|---|---|---|---|---|---|
| | C | Si | Mn | P | S | Ni | Cr | Mo | Cu | Al | N | O | Nb | V | | | | |
| Comparative Bearing: | | | | | | | | | | | | | | | | | | |
| $Z_1$ | 0.33 | 0.25 | 0.80 | 0.100 | 0.005 | 0.01 | 1.50 | 1.10 | 0.30 | 0.010 | 0.002 | 0.0012 | 0.00 | 0.00 | (common) | (common) | 3 | 90 |
| $Z_2$ | 0.34 | 0.25 | 0.79 | 0.101 | 0.004 | 0.01 | 1.49 | 1.10 | 0.30 | 0.019 | 0.004 | 0.0010 | 0.00 | 0.00 | electric furnace | carbo-nitriding | 5 | 80 |
| Bearing of the Invention: | | | | | | | | | | | | | | | | | | |
| $Q_{10}$ | 0.33 | 0.26 | 0.80 | 0.101 | 0.005 | 0.01 | 1.50 | 1.10 | 0.30 | 0.020 | 0.005 | 0.0010 | 0.00 | 0.00 | ↓ | ↓ | 7 | 60 |
| $Q_1$ | 0.33 | 0.25 | 0.81 | 0.100 | 0.005 | 0.01 | 1.49 | 1.10 | 0.30 | 0.030 | 0.010 | 0.0013 | 0.00 | 0.00 | LF | hardening | 8 | 54 |
| $Q_{11}$ | 0.35 | 0.25 | 0.80 | 0.022 | 0.008 | 0.01 | 1.45 | 1.09 | 0.30 | 0.060 | 0.015 | 0.0011 | 0.00 | 0.00 | ↓ | and | 8 | 50 |
| $Q_{12}$ | 0.35 | 0.24 | 0.80 | 0.012 | 0.003 | 0.01 | 1.48 | 1.10 | 0.30 | 0.031 | 0.010 | 0.0013 | 0.10 | 0.00 | RH | tempering | 9 | 44 |
| $Q_{13}$ | 0.35 | 0.24 | 0.81 | 0.015 | 0.006 | 0.01 | 1.49 | 1.09 | 0.29 | 0.027 | 0.010 | 0.0010 | 0.20 | 0.00 | degassing | | 10 | 39 |
| $Q_{14}$ | 0.34 | 0.25 | 0.81 | 0.019 | 0.006 | 0.01 | 1.49 | 1.10 | 0.29 | 0.033 | 0.010 | 0.0008 | 0.00 | 0.10 | ↓ | | 9 | 45 |
| $Q_{15}$ | 0.32 | 0.27 | 0.79 | 0.009 | 0.001 | 0.01 | 1.50 | 1.07 | 0.31 | 0.034 | 0.010 | 0.0010 | 0.00 | 0.20 | ingot formation | | 10 | 40 |

Table 7 shows that all the bearings $Q_1$ and $Q_{10}$ to $Q_{15}$ of the present invention which contain not less than 0.02 wt % of Al and not less than 0.005 wt % of N have a greatly lowered rate of life reduction in the presence of water than comparative bearings $Z_1$ and $Z_2$. It is also seen, comparing the bearings of the present invention, that bearings $Q_{12}$ to $Q_{15}$ containing Nb or V have a still lowered rate of life reduction in the presence of water than bearings $Q_1$ $Q_{10}$ or $Q_{11}$ containing neither Nb nor V. Al, N, Nb and V each make former austenite crystal grains finer to provide more grain boundaries through which hydrogen atoms are allowed to pass. Therefore, among the alloys having almost the same content in terms of Cu content, the Al content or the N content, as the Nb or V content increases, hydrogen gas is made to be delivered to many inclusions. Nb or V is thus effective in retarding hydrogen-induced brittleness flaking.

EXAMPLE 6

Bearings were prepared from alloy steel which had varied Cu and P contents and was produced by a varied method of steel making to examine the influences of these factors on the rate of life reduction.

Comparative bearings were prepared from alloy steel basically having the same composition as used in comparative bearing $C_0$ of Example 4 (Cu: 0.35 wt %; P: 0.015 wt %), except for slightly changing the Al and N contents (comparative bearing $C_{10}$) or decreasing the P content to 0.010 wt % and adding 0.15 wt % of Nb (comparative bearing $C_{11}$). Bearings of the invention $C_{12}$ and $C_{13}$ were prepared using the same basic composition except for changing the Cu content to 0.25 wt % or 0.24 wt %, respectively, and extremely increasing the P content to 0.100 wt % to distinguish them from the comparative bearings.

The alloy steel was prepared by either a VAR method or an ESR method.

The alloy constituents, the method of steel making, and the results of the life test are shown in Table 8 below.

TABLE 8

| Sample No. | Alloy Steel Composition (wt %) | | | | | | | | | | | | | | Method of Steel Making | Heat Processing of Bearing | Rate of Life Reduction (%) |
|---|---|---|---|---|---|---|---|---|---|---|---|---|---|---|---|---|---|
| | C | Si | Mn | P | S | Ni | Cr | Mo | Cu | Al | N | O | Nb | V | | | |
| Comparative Bearing: | | | | | | | | | | | | | | | | | |
| $C_{10}$ | 0.35 | 0.25 | 0.80 | 0.015 | 0.005 | 0.10 | 1.50 | 1.10 | 0.01 | 0.030 | 0.006 | 0.0013 | 0.00 | 0.00 | electric furnace → LF → ingot formation → VAR | (common) carbo-nitriding ↓ hardening and tempering | 95 |
| $C_{11}$ | 0.35 | 0.25 | 0.80 | 0.010 | 0.002 | 0.10 | 1.50 | 1.10 | 0.01 | 0.031 | 0.010 | 0.0004 | 0.15 | 0.00 | electric furnace → LF → RH degassing → ingot formation → ESR | | 96 |

TABLE 8-continued

| Sample No. | Alloy Steel Composition (wt %) | | | | | | | | | | | | | | Method of Steel Making | Heat Processing of Bearing | Rate of Life Reduction (%) |
| --- | --- | --- | --- | --- | --- | --- | --- | --- | --- | --- | --- | --- | --- | --- | --- | --- | --- |
| | C | Si | Mn | P | S | Ni | Cr | Mo | Cu | Al | N | O | Nb | V | | | |
| Bearing of Invention: | | | | | | | | | | | | | | | | | |
| $C_{12}$ | 0.35 | 0.25 | 0.80 | 0.10 | 0.004 | 0.10 | 1.50 | 1.10 | 0.25 | 0.033 | 0.011 | 0.0015 | 0.00 | 0.00 | electric furnace → LF → RH degassing → ingot formation → ESR | | 15 |
| $C_{13}$ | 0.35 | 0.25 | 0.80 | 0.10 | 0.008 | 0.10 | 1.50 | 1.10 | 0.24 | 0.030 | 0.009 | 0.0014 | 0.00 | 0.00 | electric furnace → LF → ingot formation → VAR | | 14 |

As is shown in Table 8, the rates of life reduction of bearings $C_{12}$ and $C_{13}$ according to the invention are distinctly lower than those of comparative bearings $C_{10}$ and $C_{11}$ and still lower than those of bearings $M_1$ to $Y_1$ of the invention shown in Table 5 and $Q_1$ and $Q_{10}$ to $Q_{15}$ of the invention shown in Table 7. These results reveal that the remelting method, i.e, a VAR method or an ESR method, is very effective on hydrogen-induced brittleness flaking as far as the Cu and P content satisfy the conditions specified in the present invention. This is because the steel prepared by the remelting method has a uniform structure with suppressed segregation and is therefore inhibited from corrosion. The amount of hydrogen evolved on the surface of such steel can thus be reduced, resulting in retardation of hydrogen-induced brittleness flaking.

If the Cu content is 0.04 wt % or less, no effect on hydrogen-induced brittleness flaking is recognized even if the alloy steel contains Nb or V or even if a VAR method or an ESR method is adopted, as can be concluded from the results of comparative bearings $C_{10}$ and $C_{11}$.

Comparative bearing $C_{11}$ was designed to aim at reduction in rate of life reduction through purification of raw material, i.e., reduction of oxygen and sulfur concentrations. However, no effect was exerted in the presence of water.

While the invention has been described in detail and with reference to specific examples thereof, it will be apparent to one skilled in the art that various changes and modifications can be made therein without departing from the spirit and scope thereof.

What is claimed is:

1. A water-resistant and long-life rolling bearing comprising an inner race, an outer race and a rolling member, which is used in an environment involving water seeping in the lubricant thereof, wherein at least one of the inner race, the outer race, and the rolling member is formed of an alloy steel containing 0.15 to 0.60% by weight of Cu and 0.10 to 1.10% by weight of C, and at least one of the inner race, the outer race and the rolling member has a hardened surface of HRC 58 to 64 with reduced segregation of inclusion, wherein the alloy steel is subjected to a vacuum arc remelting method or an electro-slag-remelting method.

2. The water-resistant and long-life rolling bearing of claim 1, wherein the alloy steel further contains at least one of Nb and V in a total amount of not more than 0.2% by weight.

3. The water-resistant and long-life rolling bearing of claim 2, wherein the alloy steel further contains 0.020 to 0.060% by weight of Al and 0.005 to 0.015% by weight of N.

4. The water-resistant and long-life rolling bearing of claim 1, wherein the alloy steel further contains 0.030 to 0.15% by weight of P.

* * * * *

UNITED STATES PATENT AND TRADEMARK OFFICE
CERTIFICATE OF CORRECTION

PATENT NO. : 6,165,289
DATED : December 26, 2000
INVENTOR(S) : Yoichi Matsumoto, Tomonobu Yoshikawa, and Takashi Nagato It is certified that error appears in the above-identified patent and that said Letters Patent is hereby corrected as shown below:

Title page
Item 30, Foreign Application Priority Data: change "February 8, 1996" to -- August 2, 1996 --, for JP 8-204545.

Signed and Sealed this

Twenty fifth Day of September, 2001

Attest:

Nicholas P. Godici

NICHOLAS P. GODICI
Attesting Officer    Acting Director of the United States Patent and Trademark Office